May 1, 1962 R. J. MULLIGAN 3,032,692
POLARITY DISCRIMINATING CONTROL METER
Filed Dec. 8, 1959 2 Sheets-Sheet 1

INVENTOR
Robert J. Mulligan
BY
Peck & Peck
ATTORNEY

May 1, 1962

R. J. MULLIGAN 3,032,692

POLARITY DISCRIMINATING CONTROL METER

Filed Dec. 8, 1959

INVENTOR
Robert J. Mulligan

BY
Peck & Peck
ATTORNEY

United States Patent Office 3,032,692
Patented May 1, 1962

3,032,692
POLARITY DISCRIMINATING CONTROL METER
Robert J. Mulligan, Hamden, Conn., assignor to International Instruments, Incorporated, New Haven, Conn., a corporation of Connecticut
Filed Dec. 8, 1959, Ser. No. 858,256
10 Claims. (Cl. 317—148.5)

This invention relates broadly to the art of indicating devices or meters, and in its more specific aspects it relates to means for controlling at a set point of the meter yet permits continuation of the meter to indicate over the full scale range; and the nature and objects of the invention will be readily recognized and understood by those skilled in the art to which it relates in the light of the following explanation and detailed description of the accompanying drawings illustrating what I at present believe to be the preferred embodiment or mechanical expressions of my invention from among various other forms, arrangements, combinations and constructions, of which the invention is capable within the spirit and scope thereof.

I have devised a novel and simple arrangement whereby this highly desirable result may be accurately accomplished.

The system of this invention generally involves an oscillator coil and a pair of pick-up coils relatively positioned with respect to each other and to the center of the meter movement to provide a control area through which the shield travels causing an unbalanced condition in the field between the coils. Through circuitry which I have developed, this unbalanced condition causes an output across the load which reverses its polarity as the shield travels through the control area, and by employing, for instance, a polarized relay, any desired operation may be initiated when a positive or negative pulse is impressed on the load circuit.

With this system an operation may be initiated at a set point on the meter scale and the actuating means locked in so that the pointer on the meter is free to travel farther along the scale thereby increasing the value and usefulness of a control and indicating meter of this character.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings.

Figure 1:
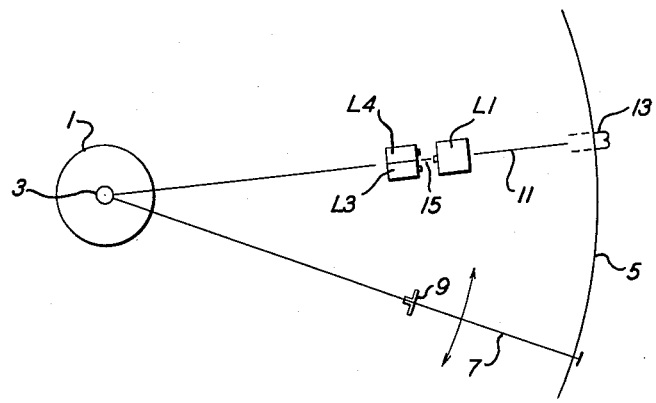
FIG. 1 is a schematic view of a meter provided with the control means of this invention.

In the accompanying drawings, and particularly FIG. 1 thereof, I have used the numeral 1 to designate a meter movement with 3 indicating the center thereof. The meter includes the usual scale 5 and the pointer 7, the end of which travels over the scale to give visual indications in the conventional manner. A shield 9 is fixed to the pointer for travel therewith. I provide any suitable set adjust arm 11, which is mounted to pivot about the center of the meter movement and at its outer end is provided with a knob or pointer 13 which extends over the scale and is accessible for manual adjustment to set the set adjust arm and the control area at the desired point.

Figure 2:
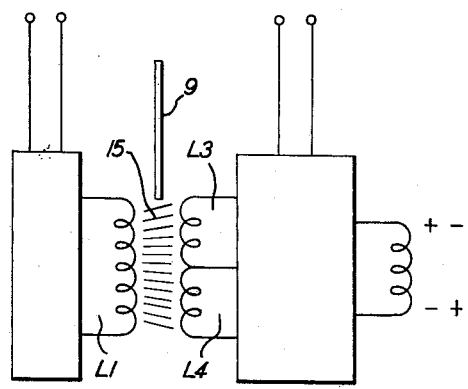
FIG. 2 is a detailed schematic view of the oscillator and pick-up coils and their relative positions to provide the control area through which the shield travels.

I mount an oscillator coil L1 on set adjust arm 11 and I mount a pair of pick-up coils L3 and L4 on the set adjust arm in spaced relation with respect to oscillator coil L1 to form a control area 15 therebetween through which shield 9 is adapted to travel as the pointer moves across the scale. As will be apparent from consideration of FIGS. 1 and 2, the pick-up coils are mounted side-by-side and the oscillator coil is mounted on the same level plane and the center line of the oscillator coil lies in the center of the pair of pick-up coils and passes through the center 3 of the meter movement. As will become evident as this description proceeds, this relative positioning of the just-described components is significant in the system which I have devised. It will be understood that the pointer 7 may be arranged to travel in a path below or above the plane of arm 11 and the shield will either extend below or above the pointer so as to pass through the control area 15.

Inside each pick-up coil L3 and L4 is an individual iron core which concentrates the magnetic field to provide sensitivity to the effect of the shield. The iron cores are in no way connected through magnetic material and it is unnecessary to wind the pick-up coils in phase opposition and, as will become apparent as this description proceeds, each coil signal is rectified to D.C. and acts as independent variables until combined after amplification.

As I have stated, I provide means whereby the travel of the shield 9 through the control area 15 between the oscillator and pick-up coils unbalances the field between them and causes a reversal of polarity of the pulse to the load. This positive negative pulse as the shield travels through the control area is made possible because of the particular positioning of the coils as described above and as particularly illustrated in FIG. 2 of the drawings. Normally there is an electromagnetic field linking the oscillator coil L1 with each pick-up coil L3 and L4 and theoretically the output to the load is zero because the field picked up by coil L3 will cancel the field picked up by coil L4. Now, with the meter operating and the needle 7 and its shield 9 moving up scale the shield will enter the control area 15 and a D.C. output pulse is obtained, and as the shield continues its travel through the control area, the output pulse reverses its polarity. Thus, the shield 9 in its travel will prevent energy from being picked up by coil L3 while coil L4 will continue to receive the same amount of energy. This unbalance causes an output across the load and of a positive polarity. Assuming that a polarized relay is used which is set not to actuate in the area where the positive portion of the wave is being generated, there will be no actuation of the relay until the negative portion of the wave is reached as a result of travel by the shield through the control area. As the shield continues its travel through the control area, it will reach mid-point and since its width is sufficient to shield both pick-up coils at the same time, L3 will be shielded equally as much as coil L4, whereupon the output to the load returns to zero. With the shield continuing its travel through the control zone it will cut the field to coil L4 and transfer of energy to coil L3 will commence. The unbalanced situation will again occur which will result in an output in the load but of a different polarity, positive to negative. Now when the unbalanced situation just mentioned occurs and the negative pulse is being generated, the relay will throw and relay contacts or the like may be opened or closed, as desired. The polarized relay remains in its locked position as it requires a positive pulse to return it to its other position. With this described action the meter pointer may travel and indicate beyond the set point, yet control action was initiated at the set or control point and the relay or the like remains in its locked position. As the pointer returns in its downscale travel, it first passes through the negative region of the control area where the relay will not operate. As the shield travels farther and into the positive region of the wave, the relay will become energized and will remain in this position as long as the shield is in the downscale side of the dead center of the control area. Thus the pointer may travel farther downscale.

Other control devices than polarized relays may be used. For instance, a single D.C. relay may be used which is not sensitive to polarity; however, since two output pulses are obtained as the shield travels through the control zone, the relay will pull in and drop out in accordance with such output pulses. The use of a single standard relay is of value in causing an alarm to actuate if the pointer moves to either side of the control set point.

It is within my contemplation to use other modes of operation. Those mentioned are merely by way of example and not intended to limit the scope of my invention.

Figure 3:
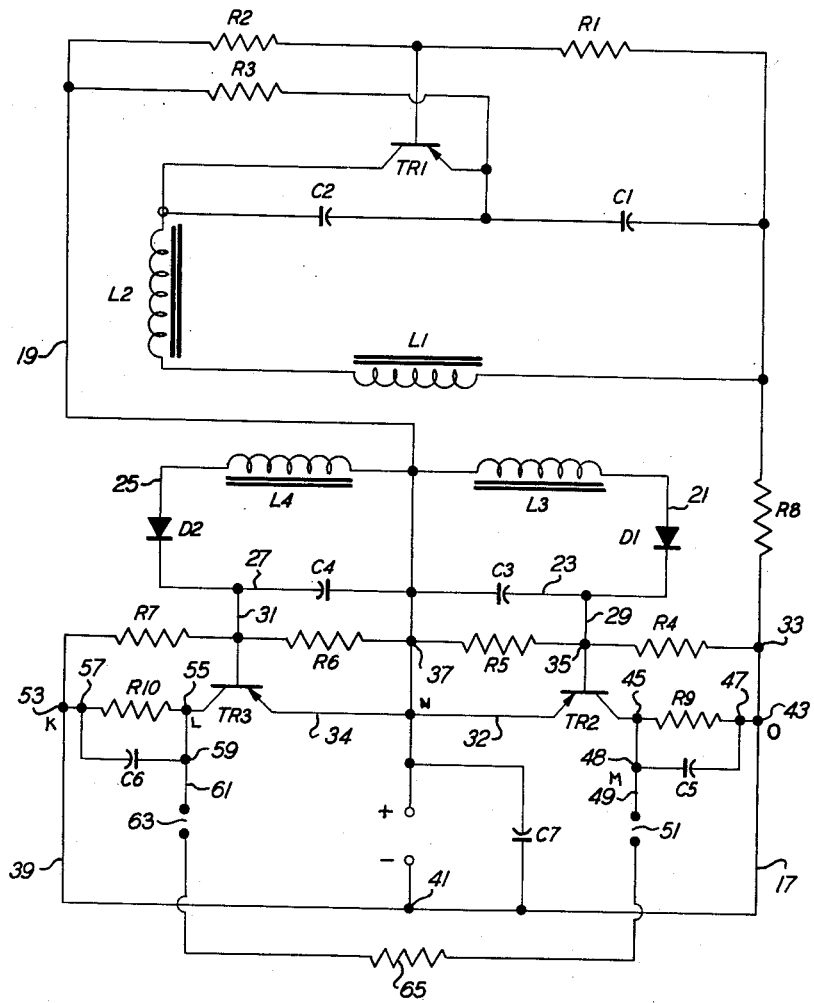
FIG. 3 is a diagram of the circuit use in accomplishing my purposes.

In FIG. 3 I have illustrated circuitry by means of which the above-described results are accomplished.

A Colpitts transistor oscillator circuit is used which comprises resistors R1, R2, R3, transistor TR1, condensers C1 and C2 and oscillator coils L1 and L2 which supply supersonic energy to pick-up coils L3 and L4. Power is supplied to the oscillator circuit from input lines 17 and 19 which also power the circuit including coils L3 and L4. Oscillator coil L2 is included in the circuit if the need arises to provide two control or set points.

The control circuit is connected to the input leads 17 and 19 and includes the pick-up coils L3 and L4, the coil L3 being connected to rectifier D1 by conductor 21, and the rectifier D1 being connected to capacitor C3 by conductor 23. The pick-up coil L4 is connected to rectifier D2 by conductor 25 and capacitor C4 and rectifier D2 are connected by conductor 27. Lead 29 connects a transistor TR2 between rectifier D1 and capacitor C3 while a lead 31 connects a transistor TR3 between rectifier D2 and capacitor C4. The transistors TR2 and TR3 are connected to lead 19 by conductors 32 and 34, respectively. A resistive network is provided comprising resistors R4 and R5 which are connected to power lead 17 at 33 and to conductor 29 at 35 and to lead 19 at 37 and a further resistive network is provided comprising resistors R6 and R7 which are connected at one end to terminal 37 and at the other end to lead 39 which is connected at 41 to input lead 17. A load resistor R9 is connected at 43 to lead 17 and at 45 to TR2. I provide a capacitor C5 connected at 47 to one end of resistor R9 and connected at terminal 48 to conductor 49 which connects load terminal 51 with terminal 45. A similar load resistor R10 is incorporated in the coil L4 circuit being connected at 53 to lead 39 and at 55 to TR3 and a capacitor C6 is connected at 57 to resistor R10 and connected at terminal 59 to conductor 61 which connects load terminal 63 with terminal 55. The load is schematically illustrated and is connected across terminals 51 and 63. Capacitors C5 and C6 are included to by-pass any A.C. component around the load resistors R9 and R10. Capacitor C7 which is connected across input lines is employed to by-pass any A.C. component around the power supply.

As an example of the operation of the circuits I shall assume that the shield 9 is shielding coil L4 so that energy is being transferred to pick-up coil L3. This energy is rectified to half wave by rectifier D1 and filtered by capacitor C3 to provide a positive bias to transistor TR2. The resistive network R4 and R5 and the power supply establishes a negative bias which cancels the positive bias to the transistor TR2, establishing a small current flow through resistor R9 which is generally .1 milliampere. When the energy to coil L3 is decreased as the shield travels through the control zone and between coil L3 and the oscillator coil, the positive bias decreases, whereupon the negative bias established by resistors R4 and R5 and the power supply causes TR2 to conduct heavily on the order of 2.5 milliamperes, through resistor R9.

It will be understood that the same operation occurs with the circuit associated with coil L3.

When the shield 9 is outside the control area 15, the transistors TR2 and TR3 are in a minimum conducting state since both resistors R4 and R7 are adjusted to a value which will provide .1 milliampere output through resistors R9 and R10 so that the potential at output terminal 51 will be equal to the potential at output terminal 63 and no current will flow through load 65. When the shield is in the control area between L1 and L3, the energy picked up by coil L3 will decrease with a resultant decrease in the positive bias to transistor TR2, and TR2 will be in a low resistance or high conducting state. Since shield 9 is only shielding pick-up coil L3, transistor TR3 continues in a high resistance or low conducting state and therefore current through the load will flow from the negative point K through R10 to point L but not through transistor TR3, from point L through the load resistance to point M and through transistor TR2 to positive point N. In traveling this path point M is positive and point L is negative with respect to the load and the first half of the pulse is established.

As the shield passes or is at the mid-point of the control zone 15, transistors TR2 and TR3 are both in a conducing state but the output being equal, the potential at points M and L are equal and no current flows through the load.

Continuing its travel through the control area 15 the shield will pass between coil L1 and coil L4, thereby decreasing the field to coil L4. When this occurs, transistor TR3 will be in a low resistance, high conducting state, and transistor TR2 will be in a low conducting high resistance state. With this condition of the transistors current through the load travels from point O through R9 to point M through the load to point L and through transistor TR3 to point N. Thus the polarity across the load is reversed in that point M is negative and point L positive with respect to the load and the second half of the wave form is completed.

I claim:
1. A polarity discriminating control meter comprising an oscillator circuit including an oscillator coil, a pair of pick-up coils arranged in side by side relation and positioned adjacent to but spaced from said oscillator coil and linked thereto by an electromagnetic field, an electric circuit for each of said pick-up coils and a power source for said circuits, means controlled by said meter and movable between said oscillator coil and said pick-up coils to alternately shield said pick-up coils from said oscillator coil to thereby decrease the energy picked up by the shielded pick-up coil, a load being connected across said pick-up coil circuits, and means for reversing the polarity of the output to the load when the means travels from position shielding one pick-up coil to position shielding the other pick-up coil, said means including rectifying and filtering means in each pick-up coil circuit connected to the input voltage and the pick-up coil, conducting means in each circuit the resistance of which varies in accordance with the polarity of the current impressed thereon, each of said conducting means being connected to its respective rectifying and filtering means and across said power source and receiving energy from its respective pick-up coil when said coil is unshielded and is receiving energy from the oscillator coil, further means in each pick-up coil circuit connected across said power source and to the respective conducting means and impressing thereon energy of opposite polarity to that transferred thereto by the pick-up coil to maintain the respective conducting means in a high resistance non-conducting condition when its respective pick-up coil is unshielded from said oscillator coil and is receiving energy therefrom, each of said conducting means being in a low resistance high conducting condition when its respective pick-up coil is shielded from said oscillator coil and is not impressing energy thereon, whereby one and then the other of said conducting means will be in conducting condition to cause a reversal of polarity of the output to the load as said first named means travels through the field between the oscillator and pick-up coils.

2. A polarity discriminating control meter in accordance with claim 1, wherein said further means comprises series connected resistors.

3. A polarity discriminating control meter in accordance with claim 1, wherein said further means comprises series connected resistors connected in parallel with said conducting means.

4. A polarity discriminating control meter in accordance with claim 1, wherein said pick-up coils are mounted side-by-side and said oscillator coil is mounted in the same level plane as said pick-up coils and the center line of said oscillator coil is coincident to the center line of the meter movement.

5. A polarity discriminating control meter in accordance with claim 1, wherein a polarized relay is connected in said load circuit.

6. A polarity discriminating control meter comprising an oscillator circuit including an oscillator coil, a pair of pick-up coils mounted side-by-side, said oscillator coil being mounted in the same level plane as said pick-up coils but spaced therefrom and the center line of said oscillator coil being coincident to the center line of the meter movement, said oscillator and pick-up coils being linked by an electromagnetic field, an electric circuit for each of said pick-up coils and a power source for said circuit means controlled by said meter and movable through said electromagnetic field between said oscillator and pick-up coils to alternately shield the pick-up coils from the oscillator coil to cause unbalance in the energy picked up by said pick-up coils, a load being connected across said pick-up coil circuits, and further means in each pick-up coil circuit causing a reversal of polarity in the output to the load each time said means travels from one shielding position to the other.

7. A polarity discriminating control meter in accordance with claim 6, wherein said further means includes conducting means the resistance of which varies in accordance with the polarity of the current impressed thereon, said conducting means connected to its respective pick-up coil for receiving current therefrom when said pick-up coil is receiving energy from said oscillator coil, and resistance means in each pick-up coil circuit connected across said power source and to the conducting means and impressing thereon current of opposite polarity to that transferred thereto by the pick-up coil.

8. A polarity discriminating control meter comprising an oscillator circuit including an oscillator coil, a pair of pick-up coils arranged in side by side relation and positioned adjacent to but spaced from said oscillator coil and linked thereto by an electromagnetic field providing a control area between said oscillator coil and said pair of pick-up coils, an electric circuit for each of said pick-up coils and a power source for said circuits, means controlled by said meter and movable through and beyond said control area, said means in moving through said control area alternately shielding said pick-up coils from said oscillator coil to thereby decrease the energy picked up by the shielded coil, a load being connected across said pick-up coil circuits, and further means connected into each pick-up coil circuit and operable to reverse the polarity of the output to the load when said means travels in the control area from position shielding one pick-up coil to position shielding the other pick-up coil, and said further means including means preventing flow of current through the load when both of said coils are unshielded and said means is beyond the control area, whereby the polarity of the output to the load will be reversed as the means moves from one shielding position to another and there will be no output to the load when each pick-up coil is unshielded and said means is beyond the control area.

9. A polarity discriminating control meter comprising an oscillator circuit including an oscillator coil, a pair of pick-up coils arranged in side by side relation and positioned adjacent to but spaced from said oscillator coil and linked thereto by an electromagnetic field, a control area being formed between the oscillator and pick-up coils, an electric circuit for each of the pick-up coils and a power source for said circuits, means controlled by said meter and movable through and beyond said control area, said means in moving through said control area alternately shielding said pick-up coils from said oscillator coil to thereby decrease the energy picked up by the shielded coil, a load being connected across said pick up coil circuits, and means for reversing the polarity of the output to the load when said means travels from position shielding one pick-up coil to position shielding the other pick-up coil, said means including rectifying and filtering means in each pick-up coil circuit connected to the input voltage and the pick-up coil, conducting means in each circuit the resistance of which varies in accordance with the polarity of the current impressed thereon, each of said conducting means being connected to its respective rectifying and filtering means and across said power source for receiving energy from its respective pick-up coil when said coil is unshielded and is receiving energy from the oscillator coil, further means in each pick-up coil circuit connected across said power source and to its respective conducting means and impressing energy of opposite polarity to that transferred by the pick-up coil to maintain the respective conducting means in a high resistance non-conducting condition when its respective pick-up coil is unshielded from said oscillator coil and is receiving energy therefrom, each of said conducting means being in a low resistance high conducting condition when its respective pick-up coil is shielded from said oscillator coil and is not impressing energy thereon, and each of said further means being adjusted to the same value, whereby when said means is outside the control area said conducting means will be in equal minimum conducting state so that the potential at the output terminals of the pick-up coil circuits will be the same and no current will flow through the load, and when said means is moving through the control area, one and then the other of said conducting means will be in conducting condition to cause a reversal of polarity of the output to the load.

10. A polarity discriminating control meter in accordance with claim 9, wherein said further means comprises series connected resistors and a further resistor is connected in each pick-up coil circuit between the conducting means and the power source, and said series connected resistors have a value which will provide on the order of .1 milliampere output through said further resistors when said means is outside the control area and said pick-up coils are receiving energy from said oscillator coil.

References Cited in the file of this patent
UNITED STATES PATENTS

| | | |
|---|---|---|
| 2,540,728 | Hansen et al. | Feb. 6, 1951 |
| 2,733,387 | Engelhard | Jan. 31, 1956 |
| 2,907,931 | Moore | Oct. 6, 1959 |